US006395430B1

(12) United States Patent
Cho et al.

(10) Patent No.: US 6,395,430 B1
(45) Date of Patent: May 28, 2002

(54) HYBRID POLYMER ELECTROLYTE FOR LITHIUM BATTERY AND METHOD OF PREPARING SAME

(75) Inventors: Jae-phil Cho; Geun-bae Kim, both of Kyungki-do; Yong-chul Park, Seoul, all of (KR)

(73) Assignee: Samsung Display Devices Co., Ltd., Kyungki-do (KR)

( * ) Notice: Subject to any disclaimer, the term of this patent is extended or adjusted under 35 U.S.C. 154(b) by 0 days.

(21) Appl. No.: 09/143,187

(22) Filed: Aug. 28, 1998

(30) Foreign Application Priority Data

Aug. 28, 1997 (KR) ........................................... 97-41936

(51) Int. Cl.[7] .............................................. H01M 10/26

(52) U.S. Cl. ....................................... 429/316; 429/326

(58) Field of Search ............................ 429/231.95, 129, 429/188, 326, 62.2, 304, 316; 252/62.2

(56) References Cited

U.S. PATENT DOCUMENTS

| | | | | | |
|---|---|---|---|---|---|
| 5,252,413 | A | * | 10/1993 | Alamgir et al. | 429/192 |
| 5,296,318 | A | | 3/1994 | Gozdz et al. | |
| 5,540,741 | A | * | 7/1996 | Gozdz et al. | 29/623.5 |
| 5,552,239 | A | | 9/1996 | Gozdz et al. | 429/94 |
| 5,585,039 | A | * | 12/1996 | Matsumoto et al. | 252/500 |
| 5,858,264 | A | * | 1/1999 | Ichino et al. | 252/62.2 |

* cited by examiner

*Primary Examiner*—Gabrielle Brouillette
*Assistant Examiner*—M. Wills
(74) *Attorney, Agent, or Firm*—Christie, Parker & Hale, LLP

(57) ABSTRACT

A hybrid polymer electrolyte includes a copolymer matrix of poly(vinyl chloride) and poly(vinylidene chloride) having a plurality of pores, and a solution of an alkali metal salt in an organic solvent entrained in the pores of the copolymer matrix. The pores of the copolymer matrix occupy 10 to 50 volume percent of the hybrid polymer electrolyte.

13 Claims, 6 Drawing Sheets

HYBRID POLYMER ELECTROLYTE FOR LITHIUM BATTERY AND METHOD OF PREPARING SAME

CROSS REFERENCE TO RELATED APPLICATION

This application claims priority to Korean patent application No. 97-41936 filed Aug. 28, 1997, the content of which is incorporated herein by reference as if set forth in full.

FIELD OF THE INVENTION

The present invention relates to a hybrid polymer electrolyte for a lithium battery and a method of preparing the same and, more particularly, to a hybrid polymer electrolyte having a high ionic conductivity and a good stability.

BACKGROUND OF THE INVENTION

Generally, batteries are designed to convert the chemical energy contained in its active materials into electric energy by means of an electrochemical reaction. Among them, batteries using lithium metal or materials capable of intercalating and de-intercalating lithium ions as the negative electrode are called "lithium" batteries.

Lithium metal is attractive as the negative electrode material of the battery because it has a light weight and a high capacity per unit weight capable of outputting high voltage in the battery. Because of these outstanding features, the use of lithium has predominated in the development of high-performance primary and secondary batteries. However, the lithium battery has a potential safety problem particularly where the lithium metal is used for the negative electrode in conjunction with a liquid electrolyte.

Given this problem, an alternate way to make a battery is to use an electrolyte, such as a solid polymer electrolyte, which is less reactive with lithium. However, although a solid polymer electrolyte enhances the safety of the battery, it has lower ionic conductivity compared to a liquid electrolyte. For example, in a solid polymer electrolyte having high molecular polymers such as poly(ethylene oxide) and poly(propylene oxide), the ionic conductivity is in the range of about $10^{-7}$~$10^{-4}$($\Omega$.cm)$^{-1}$ at 20° C.~100° C. so that it is not practical for normal temperature applications. Thus, a polymer electrolyte having a practical conductivity as high as $10^{-3}$($\Omega$.cm)$^{-1}$ at room temperature while ensuring the safety of the battery has been newly developed.

U.S. Pat. No. 5,252,413 discloses poly(vinyl chloride) electrolytes having improved ionic conductivity. However, when a Li/$LiMn_2O_4$ battery is assembled with such an electrolyte, the charge/discharge voltage of the battery cannot be around 4V characteristic of the lithium battery but less than 3V due to the interfacial resistance at the lithium/electrolytes interface.

U.S. Pat. No. 5,296,318 discloses polymer electrolytes comprising a copolymer film of vinylidene fluoride and hexafluoropropylene entraining a solution of lithium salts therein.

U.S. Pat. No. 5,552,239 discloses plasticized hybrid polymer electrolytes comprising plasticizers.

SUMMARY OF THE INVENTION

It is an object of the present invention to provide a hybrid polymer electrolyte for a lithium battery and that has higher ionic conductivity and good stability.

In order to achieve this object and others, the present invention provides a hybrid polymer electrolyte including a copolymer matrix of poly(vinyl chloride) and poly(vinylidene chloride) having a plurality of pores, and a solution of an alkali metal salt in an organic solvent entrained in the pores of the copolymer matrix.

A method for preparing the hybrid polymer electrolyte includes the steps of obtaining a solution by dissolving an alkali metal salt and an organic solvent in tetrahydrofuran, obtaining a mixture by mixing a copolymer of poly(vinyl chloride) and poly(vinylidene chloride) with the solution, forming the mixture into a film, and evaporating off the tetrahydrofuran from the film.

A lithium battery with such a hybrid polymer electrolyte may be prepared by using lithium metal or materials capable of intercalating and de-intercalating lithium ions as the negative electrode.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

Figure 1A:
FIG. 1A is a SEM photograph of a hybrid polymer electrolyte according to Example 1.
Figure 1B:
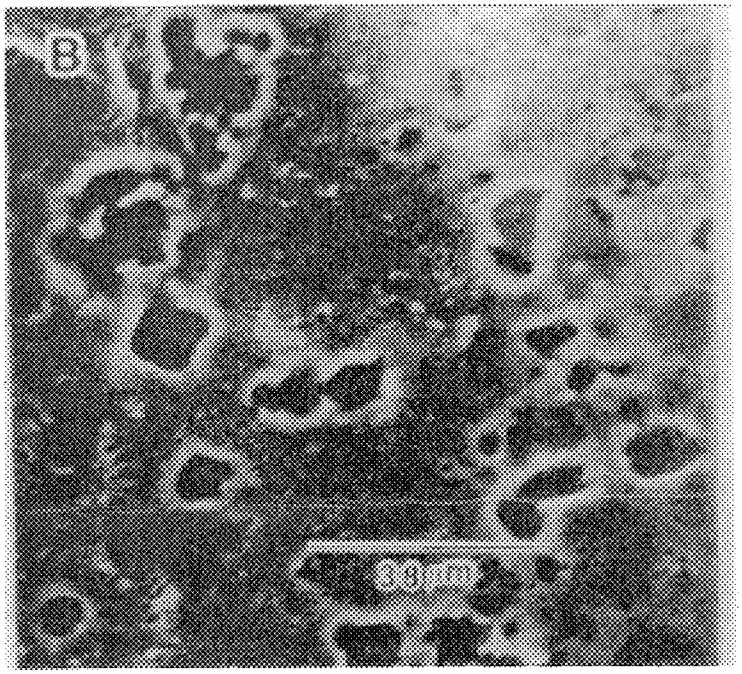
FIG. 1B is a SEM photograph of a hybrid polymer electrolyte according to Example 2.
Figure 1C:
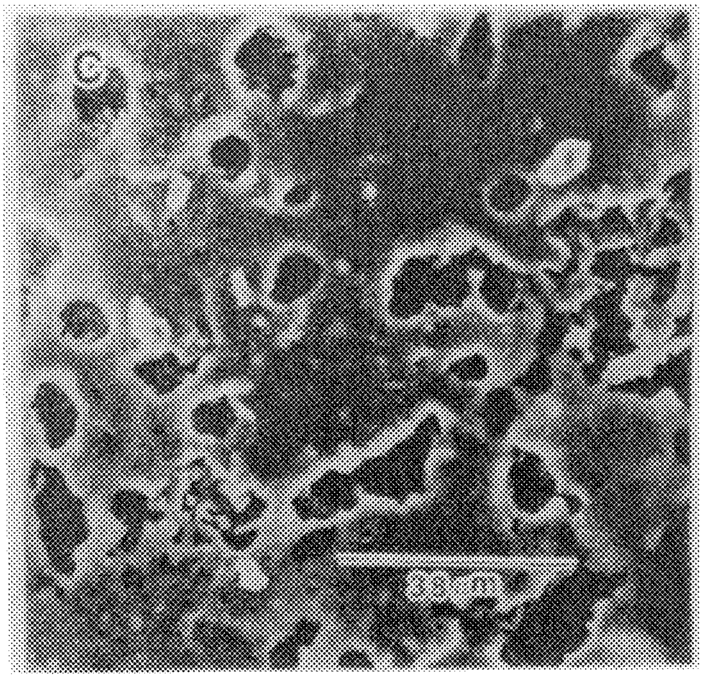
FIG. 1C is a SEM photograph of a hybrid polymer electrolyte according to Example 3.
Figure 1D:
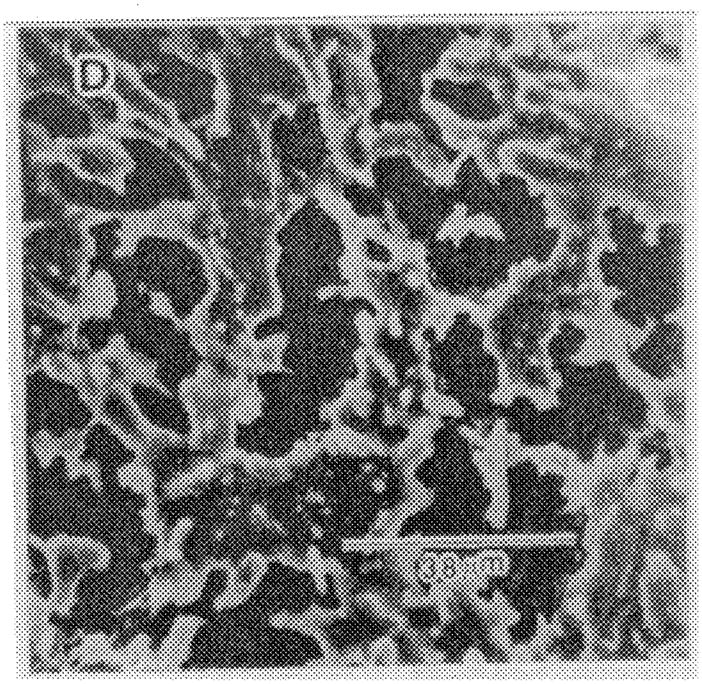
FIG. 1D is a SEM photograph of a hybrid polymer electrolyte according to Example 4.

The hybrid polymer electrolyte according to the present invention includes a copolymer matrix of poly(vinyl chloride) and poly(vinylidene chloride) having a plurality of pores, and a solution of an alkali metal salt in an organic solvent entrained in the pores of the copolymer matrix.

The pores of the copolymer matrix occupy preferably 10 to 50, more preferably 25 to 50, volume percent of the hybrid polymer electrolyte. The alkali metal salt is preferably a lithium salt. The lithium salt is preferably at least one compound selected from the group consisting of $Li/ClO_4$, $LiBF_4$, $LiCF_3SO_3$, $LiAsF_6$, $LiPF_6$, and $LiN(CF_3SO_2)_2$. The lithium salt is more preferably $LiN(CF_3SO_2)_2$. The organic solvent is preferably selected from the group consisting of ethylene carbonate, propylene carbonate, dimethyl carbonate, diethylene carbonate, and mixtures thereof.

When a mixture of ethylene carbonate and propylene carbonate is used as the organic solvent, the ionic conductivity of the electrolyte reaches up to $2\times10^{-3}(\Omega.cm)^{1}$ and its stability is also good. The organic solvent may be also selected from the group consisting of dimethyl sulfoxide, tetramethylene sulfone, gamma-butyrolactone, N-methyl-2-pyrrolidone, and tri-and tetra-ethylene glycol dimethyl ether.

The copolymer matrix contains preferably 70 to 80 weight percent of poly(vinyl chloride) and 20 to 30 weight percent of poly(vinylidene chloride) and, more preferably, 75 weight percent of poly(vinyl chloride) and 25 weight percent of poly(vinylidene chloride). The hybrid polymer electrolyte preferably contains 20 to 35 weight percent of the copolymer matrix, 20 to 35 weight percent of the alkali metal salt, and 30 to 60 weight percent of the organic solvent.

Through the repeated experiments, the porous volume fraction of the copolymer matrix was found to be a critical factor in obtaining higher ionic conductivity. When the porous volume of the copolymer matrix occupies 40 percent of the hybrid polymer electrolyte, the ionic conductivity of the electrolyte reaches up to $2\times10^{-3}(\Omega.cm)^{-1}$ at room temperature. Thus, in the hybrid polymer electrolyte of the present invention, such a copolymer matrix is adopted.

The present invention will be now described with reference to Examples and drawings.

EXAMPLE 1

$LiN(CF_3SO_2)_2$ dried at 120° C. in a vacuum state and a mixture of ethylene carbonate (EC) and propylene carbonate (PC) in the amounts shown in Table I were dissolved in 10 ml tetrahydrofuran (THF) within a sealed glass bottle and stirred well until a completely dissolved mixture was obtained. A copolymer of poly(vinyl chloride) (PVC) and poly(vinylidene chloride) (PVdCl) in the amounts shown in Table 1 was then added to the mixture and again stirred well for about 15 minutes while being warmed to about 50° C. to facilitate dissolution, thereby obtaining a viscous solution. The viscous solution was then poured onto a TEFLON block and left under a dry argon gas for about an hour to thereby evaporate off the THF. On evaporating off the THF, a stable and flexible thin film of hybrid polymer electrolyte was formed.

TABLE 1

| | Ratio in weight or volume | Composition (g) | Composition (wt %) |
|---|---|---|---|
| Copolymer of PVC and PVdCl | PVC:PVdCl = 75:25 (wt %) | 0.4 | 20 |
| $LiN(CF_3SO_2)_2$ | | 0.4 | 20 |
| Mixture of EC and PC | EC:PC = 66:34 (vol %) | 1.2 | 60 |

EXAMPLE 2

$LiN(CF_3SO_2)_2$ dried at 120° C. in a vacuum state and a mixture of EC and PC in the amounts shown in Table 2 were dissolved in 10 ml THF within a sealed glass bottle and stirred well until a completely dissolved mixture was obtained. A copolymer of PVC and PVdCl in the amounts shown in Table 2 was then added to the mixture and again stirred well for about 15 minutes while being warmed to about 50° C. to facilitate dissolution, thereby obtaining a viscous solution. The viscous solution was then poured onto a TEFLON block and left under a dry argon gas for about an hour to thereby evaporate off the THF. On evaporating off the THF, a stable and flexible thin film of hybrid polymer electrolyte was formed.

TABLE 2

| | Ratio in weight or volume | Composition (g) | Composition (wt %) |
|---|---|---|---|
| Copolymer of PVC and PVdCl | PVC:PVdCl = 75:25 (wt %) | 0.5 | 25 |
| $LiN(CF_3SO_2)_2$ | | 0.5 | 25 |
| Mixture of EC and PC | EC:PC = 66:34 (vol %) | 1 | 50 |

EXAMPLE 3

$LiN(CF_3SO_2)_2$ dried at 120° C. in a vacuum state and a mixture of EC and PC in the amounts shown in Table 3 were dissolved in 10 ml THF within a sealed glass bottle and stirred well until a completely dissolved mixture was obtained. A copolymer of PVC and PVdCl in the amounts shown in Table 3 was then added to the mixture and again stirred well for about 15 minutes while being warmed to about 50° C. to facilitate dissolution, thereby obtaining a viscous solution. The viscous solution was then poured onto a TEFLON block and left under a dry argon gas for about an hour to thereby evaporate off the THF. On evaporating off the THF, a stable and flexible thin film of hybrid polymer electrolyte was formed.

TABLE 3

| | Ratio in weight or volume | Composition (g) | Composition (wt %) |
|---|---|---|---|
| Copolymer of PVC and PVdCl | PVC:PVdCl = 75:25 (wt %) | 0.7 | 35 |
| $LiN(CF_3SO_2)_2$ | | 0.7 | 35 |
| Mixture of EC and PC | EC:PC = 66:34 (vol %) | 0.6 | 30 |

EXAMPLE 4

$LiN(CF_3SO_2)_2$ dried at 120° C. in a vacuum state and a mixture of EC and PC in the amounts shown in Table 4 were dissolved in 10 ml THF within a sealed glass bottle and stirred well until a completely dissolved mixture was obtained. A copolymer of PVC and PVdCl in the amounts shown in Table 4 was then added to the mixture and again stirred well for about 15 minutes while being warmed to about 50° C. to facilitate dissolution, thereby obtaining a viscous solution. The viscous solution was then poured onto a TEFLON block and left under a dry argon gas for about an hour to thereby evaporate off the THF. On evaporating off the THF, a stable and flexible thin film of hybrid polymer electrolyte was formed.

TABLE 4

| | Ratio in weight or volume | Composition (g) | Composition (wt %) |
|---|---|---|---|
| Copolymer of PVC and PVdCl | PVC:PVdCl = 75:25 (wt %) | 0.9 | 45 |
| $LiN(CF_3SO_2)_2$ | | 0.9 | 45 |
| Mixture of EC and PC | EC:PC = 66:34 (vol %) | 0.2 | 10 |

EXAMPLE 5

$LiN(CF_3SO_2)_2$ dried at 120° C. in a vacuum state and a mixture of EC and PC in the amounts shown in Table 5 were dissolved in 10 ml THF within a sealed glass bottle and stirred well until a completely dissolved mixture was obtained. A copolymer of PVC and PVdCl in the amounts shown in Table 5 was then added to the mixture and again stirred well for about 15 minutes while being warmed to about 50° C. to facilitate dissolution, thereby obtaining a viscous solution. The viscous solution was then poured onto a TEFLON block and left under a dry argon gas for about an hour to thereby evaporate off the THF. On evaporating off the THF, a stable and flexible thin film of hybrid polymer electrolyte was formed.

TABLE 5

| | Ratio in weight or volume | Composition (g) | Composition (wt %) |
|---|---|---|---|
| Copolymer of PVC and PVdCl | PVC:PVdCl = 75:25 (wt %) | 0.5 | 25 |
| $LiN(CF_3SO_2)_2$ | | 0.5 | 25 |
| Mixture of EC and PC | EC:PC = 50:50 (vol %) | 1 | 50 |

EXAMPLE 6

$LiN(CF_3SO_2)_2$ dried at 120° C. in a vacuum state and PC in the amounts shown in Table 6 were dissolved in 10 ml THF within a sealed glass bottle and stirred well until a completely dissolved mixture was obtained. A copolymer of PVC and PVdCl in the amounts shown in Table 6 was then added to the mixture and again stirred well for about 15 minutes while being warmed to about 50° C. to facilitate dissolution, thereby obtaining a viscous solution. The viscous solution was then poured onto a TEFLON block and left under a dry argon gas for about an hour to thereby evaporate off the THF. On evaporating off the THF, a stable and flexible thin film of hybrid polymer electrolyte was formed.

TABLE 6

| | Ratio in weight or volume | Composition (g) | Composition (wt %) |
|---|---|---|---|
| Copolymer of PVC and PVdCl | PVC:PVdCl = 75:25 (wt %) | 0.5 | 25 |
| $LiN(CF_3SO_2)_2$ | | 0.5 | 25 |
| Mixture of EC and PC | EC:PC = 50:50 (vol %) | 1 | 50 |

EXAMPLE 7

$LiN(CF_3SO_2)_2$ dried at 120° C. in a vacuum state and a mixture of EC and dimethyl carbonate (DMC) in the amounts shown in Table 7 were dissolved in 10 ml THF within a sealed glass bottle and stirred well until a completely dissolved mixture was obtained. A copolymer of PVC and PVdCl in the amounts shown in Table 7 was then added to the mixture and again stirred well for about 15 minutes while being warmed to about 50° C. to facilitate dissolution, thereby obtaining a viscous solution. The viscous solution was then poured onto a TEFLON block and left under a dry argon gas for about an hour to thereby evaporate off the THF. On evaporating off the THF, a stable and flexible thin film of hybrid polymer electrolyte was formed.

TABLE 7

| | Ratio in weight or volume | Composition (g) | Composition (wt %) |
|---|---|---|---|
| Copolymer of PVC and PVdCl | PVC:PVdCl = 75:25 (wt %) | 0.5 | 25 |
| $LiN(CF_3SO_2)_2$ | | 0.5 | 25 |
| Mixture of EC and PC | EC:PC = 50:50 (vol %) | 1 | 50 |

EXAMPLE 8

$LiPF_6$ dried at 120° C. in a vacuum state and a mixture of EC and PC in the amounts shown in Table 8 were dissolved in 10 ml THF within a sealed glass bottle and stirred well until a completely dissolved mixture was obtained. A copolymer of PVC and PVdCl in the amounts shown in Table 8 was then added to the mixture and again stirred well for about 15 minutes while being warmed to about 50° C. to facilitate dissolution, thereby obtaining a viscous solution. The viscous solution was then poured onto a TEFLON block and left under a dry argon gas for about an hour to thereby evaporate off the THF. On evaporating off the THF, a stable and flexible thin film of hybrid polymer electrolyte was formed.

TABLE 8

| | Ratio in weight or volume | Composition (g) | Composition (wt %) |
|---|---|---|---|
| Copolymer of PVC and PVdCl | PVC:PVdCl = 75:25 (wt %) | 0.4 | 20 |
| $LiN(CF_3SO_2)_2$ | | 0.4 | 20 |
| Mixture of EC and PC | EC:PC = 66:34 (vol %) | 1.2 | 60 |

EXAMPLE 9

$LiClO_4$ dried at 120° C. in a vacuum state and a mixture of EC and PC in the amounts shown in Table 9 were dissolved in 10 ml THF within a sealed glass bottle and stirred well until a completely dissolved mixture was obtained. A copolymer of PVC and PVdCl in the amounts shown in Table 9 was then added to the mixture and again stirred well for about 15 minutes while being warmed to about 50° C. to facilitate dissolution, thereby obtaining a viscous solution. The viscous solution was then poured onto a TEFLON block and left under a dry argon gas for about an hour to thereby evaporate off the THF. On evaporating off the THF, a stable and flexible thin film of hybrid polymer electrolyte was formed.

TABLE 9

| | Ratio in weight or volume | Composition (g) | Composition (wt %) |
|---|---|---|---|
| Copolymer of PVC and PVdCl | PVC:PVdCl = 75:25 (wt %) | 0.4 | 20 |
| $LiClO_4$ | | 0.4 | 20 |
| Mixture of EC and PC | EC:PC = 66:34 (vol %) | 1.2 | 60 |

EXAMPLE 10

A $Li/LiMn_2O_4$ lithium battery was prepared by inserting the electrolyte prepared according to Example 1 (having a thickness of 1.5 mm) between a lithium metal for the negative electrode and $LiMn_2O_4$ for the positive electrode, employing the conventional battery fabrication technique.

EXAMPLE 11

A $C/LiMn_2O_4$, lithium battery was prepared by inserting the electrolyte prepared according to Example 1 (having a thickness of 1.5 mm) between a graphite for the negative electrode and $LiMn_2O_4$ for the positive electrode, employing the conventional battery construction technique.

In order to measure the volume occupied by the pores of the copolymer of PVC and PVdCl in the hybrid polymer electrolyte films prepared according to Examples 1, 2, 3 and 4, the electrolyte films are completely dried under the dry argon gas and photographed by using SEM. The SEM photographs of the dried hybrid polymer electrolyte films, corresponding to Examples 1 to 4, are given in FIG. 1A to 1D, respectively. The porous volume fraction of the copolymer was determined by the point-counting method with the SEM photographs. Furthermore, the optimum porous volume fraction and the accompanying ionic conductivity were determined by the effective medium percolation theory and the results are presented in Table 10 and FIG. 2A.

TABLE 10

| Type of electrolytes | | Porous volume fraction | Ionic conductivity $(\Omega \cdot cm)^{-1}$ |
|---|---|---|---|
| Liquid electrolyte | | 1 | 0.01 |
| Example 1 (hybrid type) | A | 0.4 | $2 \times 10^{-3}$ |
| Example 2 (hybrid type) | B | 0.3 | $1.6 \times 10^{-3}$ |
| Example 3 (hybrid type) | C | 0.2 | $6.5 \times 10^{-5}$ |
| Example 4 (hybrid type) | D | 0.1 | $3.5 \times 10^{-5}$ |
| Solid polymer electrolyte | E | 0 | $3 \times 10^{-5}$ |

Figure 2A:
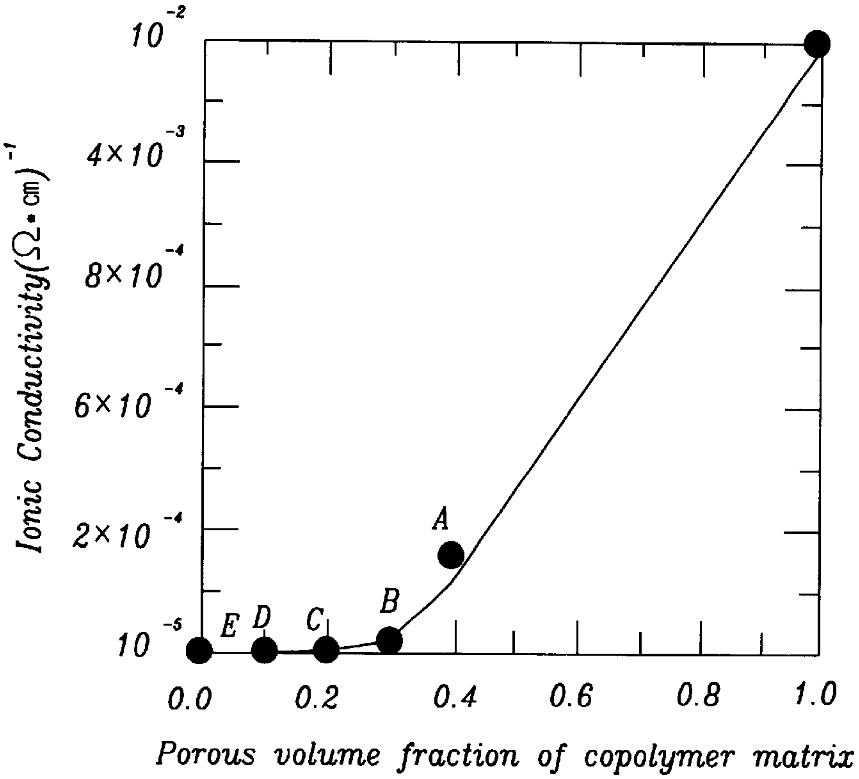
FIG. 2A is a graph showing the theoretical relationship between the porous volume fraction of a copolymer matrix and the ionic conductivity.
Figure 2B:
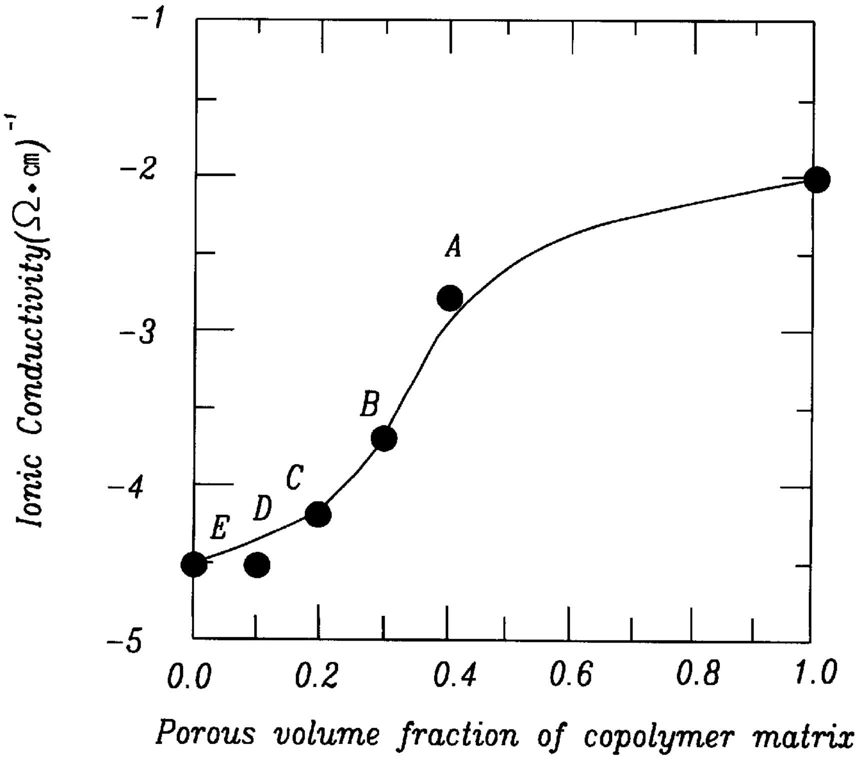
FIG. 2B is a graph showing the experimental relationship between the porous volume fraction of a copolymer matrix and the log value of ionic conductivity.

As shown in FIG. 2A, when the porous volume fraction was 0, the resulting electrolyte was a solid polymer electrolyte composed of a copolymer of poly(vinyl chloride) and poly(vinylidene chloride), and $LiN(CF_3SO_2)_2$. In contrast, when the porous volume fraction was 1, the resulting electrolyte was a liquid electrolyte composed of $LiN(CF_3SO_2)_2$ dissolved in a mixture of EC and PC. FIG. 2B shows the log value of ionic conductivity experimentally measured with respect to the liquid electrolyte, the solid polymer electrolyte and the hybrid-type polymer electrolytes from Examples 1 to 4. It can be seen from FIGS. 2A and 2B that the theoretically computed value of ionic conductivity is nearly corresponding to the practically measured value of ionic conductivity. In this way, the porous volume fraction of the copolymer matrix was found to be a critical factor in enhancing the ionic conductivity of the hybrid polymer electrolyte.

Figure 3:
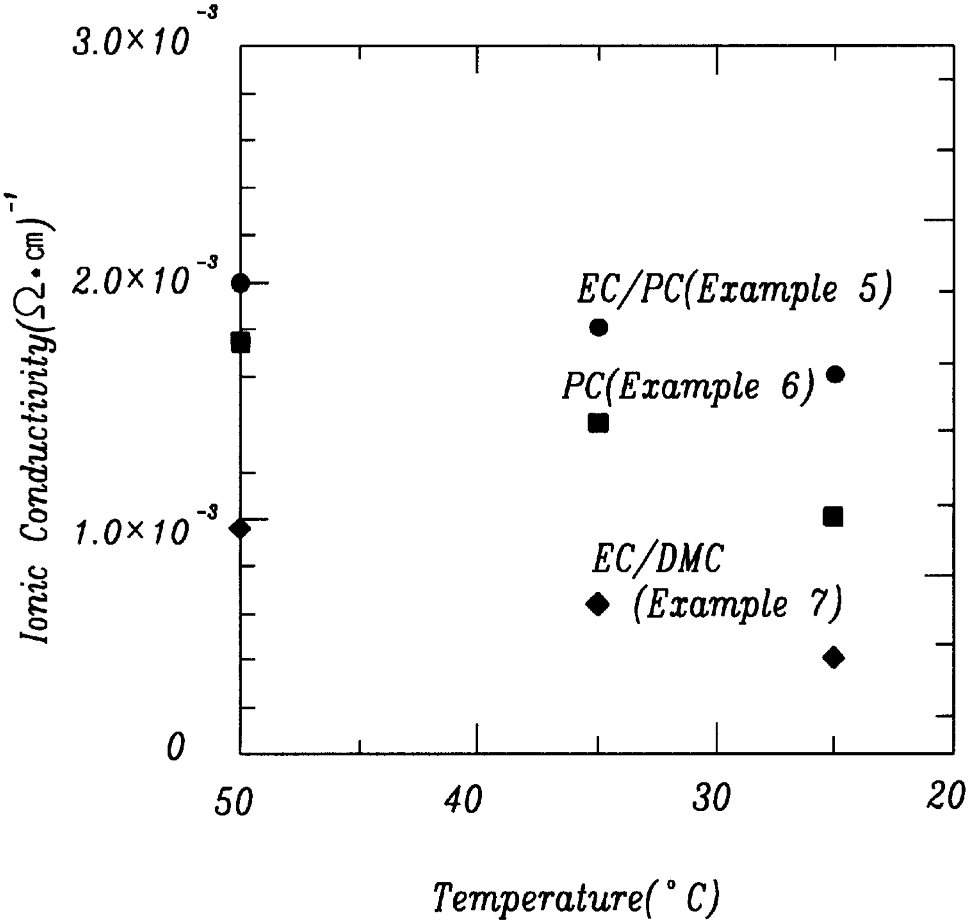
FIG. 3 is a graph showing the ionic conductivity of hybrid polymer electrolytes using various organic solvents as a function of temperature according to Examples 5 to 7.
Figure 4A:
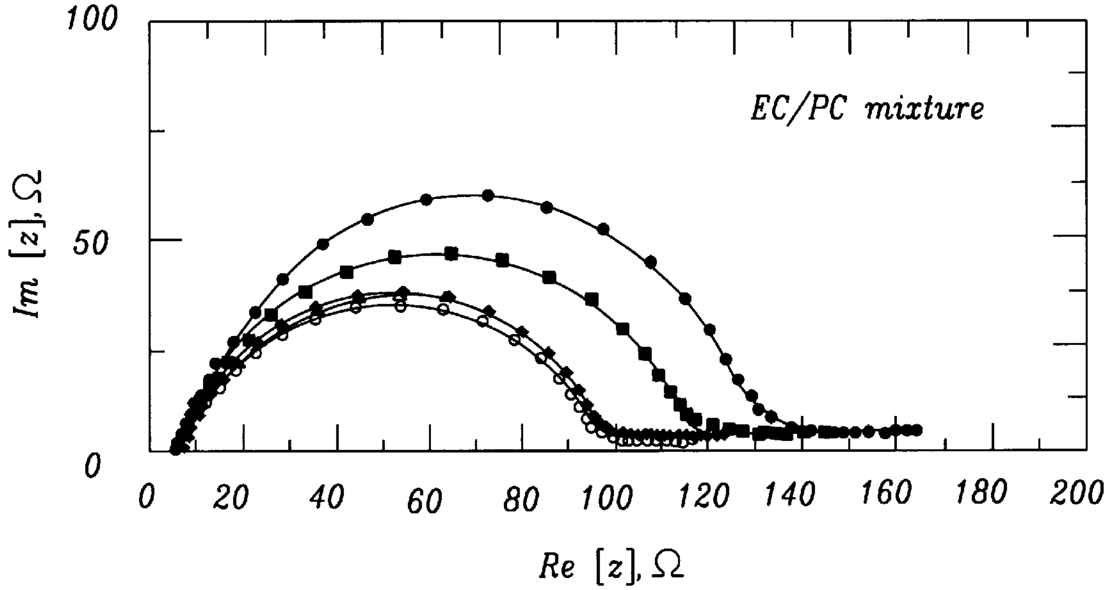
FIG. 4A is a graph showing the interfacial resistance of a hybrid polymer electrolyte based on a mixture of ethylene carbonate and polypropylene carbonate at the electrode/electrolyte interface as a function of time according to Example 5.
Figure 4B:
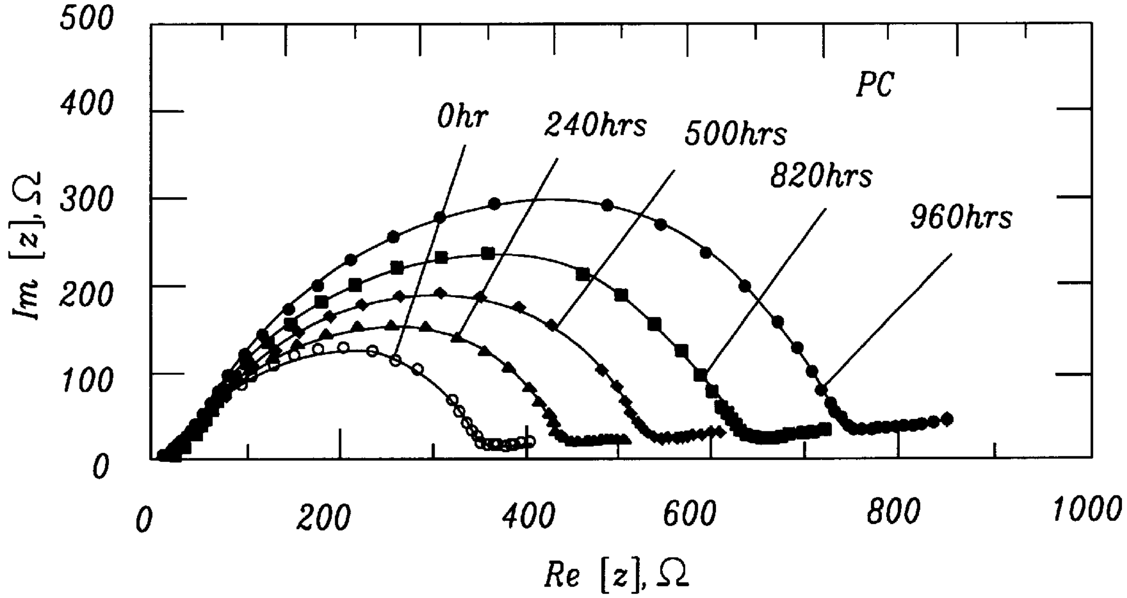
FIG. 4B is a graph showing the interfacial resistance of a hybrid polymer electrolyte based on polypropylene carbonate at the electrode/electrolyte interface as a function of time according to Example 6.
Figure 4C:
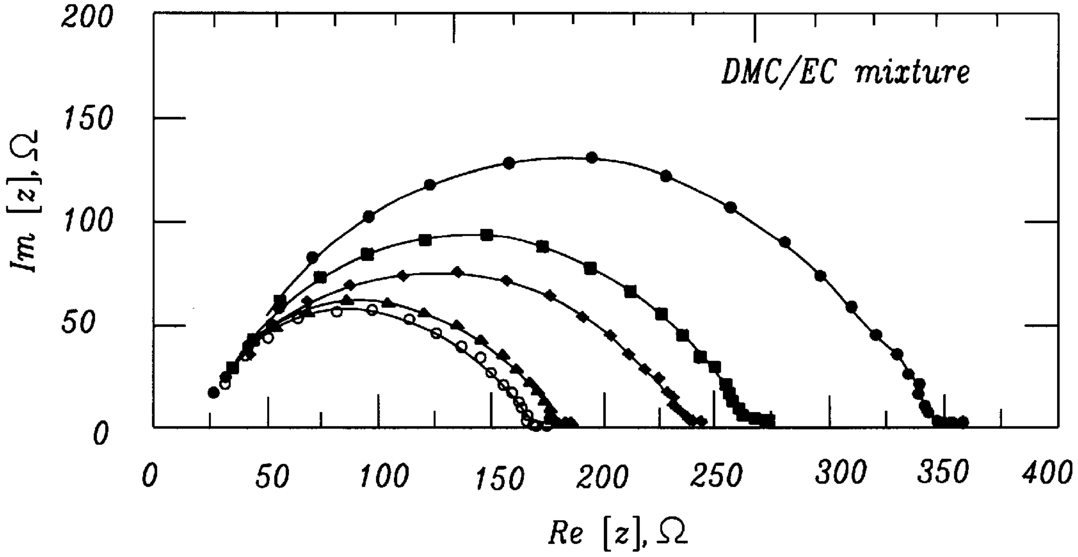
FIG. 4C is a graph showing the interfacial resistance of a hybrid polymer electrolyte based on a mixture of dimethyl carbonate and ethylene carbonate at the electrode/electrolyte interface as a function of time according to Example 7.

Lithium batteries were prepared by inserting the hybrid polymer electrolytes prepared according to Examples 5, 6 and 7 between the lithium metal for the negative electrode and $LiMn_2O_4$ for the positive electrode. Then, their ion conductivities were tested at 25° C., 35° C. and 50° C., and the electrolyte from Example 5 using the mixture of EC and PC turned out to have relatively higher ionic conductivity. The results are presented in FIG. 3. Furthermore, the stabilities of the hybrid polymer electrolytes prepared according to Examples 5, 6 and 7 against the electrode materials were tested, and the electrolyte from Example 5 using the mixture of EC and PC turned out to be relatively stable. The results are graphically presented in FIGS. 4A, 4B and 4C. As shown in FIG. 4A, in the electrolyte using the mixture of EC and PC, the interfacial resistance at the electrode/electrolyte interface increases only from 100Ω to 130Ω after 960 hours.

The ionic conductivities of the hybrid polymer electrolytes prepared according to Examples 1, 8 and 9 were tested at room temperature, and the results are presented in Table 11. In the electrolytes, different classes of lithium salts were used but other relevant conditions were the same. Therefore, the ionic conductivities of the electrolytes can be compared to each other as a function of the lithium salt component.

TABLE 11

| | Lithium salt | Ionic conductivity $(\Omega \cdot cm)^{-1}$ |
|---|---|---|
| Example 1 | $LN(CF_3SO_2)_2$ | $2 \times 10^{-3}$ |
| Example 8 | $LiPF_6$ | $1.8 \times 10^{-3}$ |
| Example 9 | $LiClO_4$ | $1.85 \times 10^{-3}$ |

Figure 5:
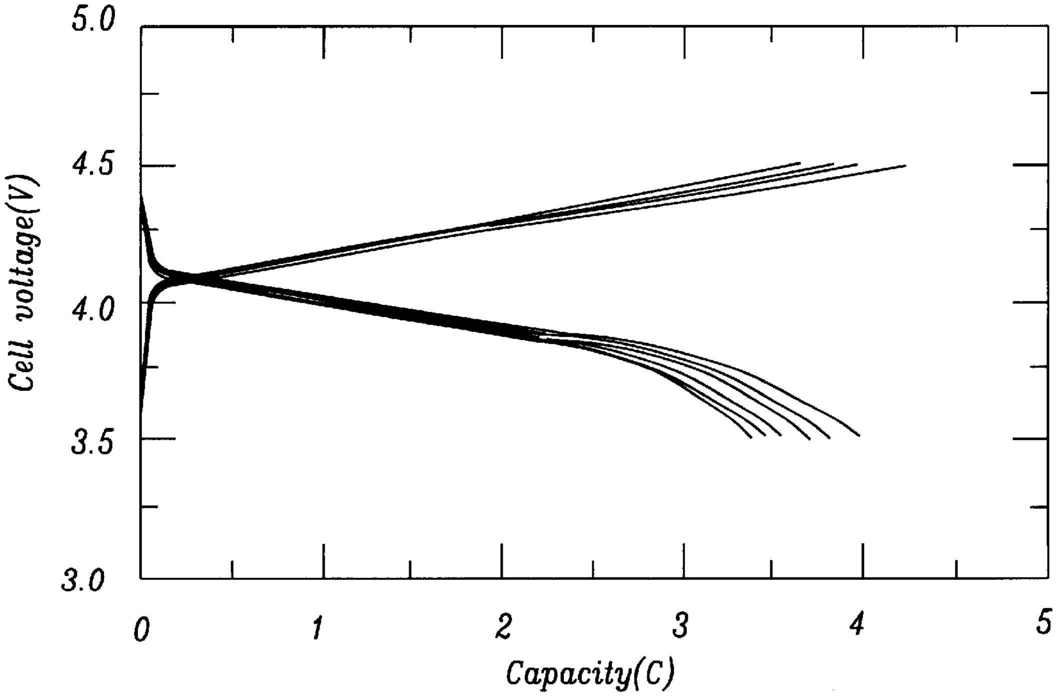
FIG. 5 is a graph showing charge and discharge voltage curves of a lithium battery based on a hybrid polymer electrolyte according to Example 10.

As shown in Table 11, it can be seen that the ionic conductivity of the electrolyte from Example 1 using $LiN(CF_3SO_2)_2$ is relatively higher. The lithium battery prepared according to Example 10 is charged and discharged at room temperature with a current density of 0.2 $mA/cm^2$. The battery showed an average voltage window between 3.5 and 4.5 V and a midpoint voltage around 4 V characteristic of the lithium battery. The results are graphically presented in FIG. 5.

As described above, the hybrid polymer electrolyte of the present invention has high ionic conductivity as well as good stability. Furthermore, lithium batteries using the hybrid polymer electrolyte exhibit charge and discharge voltages of around 4 V, characteristic of a lithium battery.

While the present invention has been described in detail with reference to the preferred embodiments, those skilled in an art will appreciate that various modifications and substitutions can be made thereto without departing from the spirit and scope of the present invention as set forth in the appended claims.

What is claimed is:

1. A hybrid polymer electrolyte comprising:

a copolymer matrix of poly(vinyl chloride) and poly(vinylidene chloride) having a plurality of pores that occupy 10 to 50 volume percent of the hybrid polymer electrolyte; and a solution of an alkali metal salt in an organic solvent entrained in the pores of the copolymer matrix.

2. The hybrid polymer electrolyte of claim 1 wherein the pores of the copolymer matrix occupy 25 to 50 volume percent of the hybrid polymer electrolyte.

3. The hybrid polymer electrolyte of claim 1 wherein the alkali metal salt is a lithium salt.

4. The hybrid polymer electrolyte of claim 3 wherein the lithium salt comprises at least one compound selected from the group consisting $LiClO_4$, $LiBF_4$, $LiCF_3SO_3$, $LiAsF_6$, $LiPF_6$, and $LiN(CF_3SO_2)_2$.

5. The hybrid polymer electrolyte of claim 1 wherein the organic solvent is selected from the group consisting of ethylene carbonate, propylene carbonate, dimethyl carbonate, diethylene carbonate, and mixtures thereof.

6. The hybrid polymer electrolyte of claim 1 wherein the copolymer matrix contains a 3:1 mixture by weight of poly(vinyl chloride) and poly(vinylidene chloride).

7. The hybrid polymer electrolyte of claim 1 wherein the hybrid polymer electrolyte comprises 20 to 35 weight percent of the copolymer matrix, 20 to 35 weight percent of the alkali metal salt, and 30 to 60 weight percent of the organic solvent.

8. The hybrid polymer electrolyte of claim 1 wherein the organic solvent is a mixture of ethylene carbonate and propylene carbonate, the alkali metal salt is $LiN(CF_3SO_2)_2$, and the copolymer matrix contains a 3:1 mixture by weight of poly(vinyl chloride) and poly(vinylidene chloride).

9. A lithium battery comprising a hybrid polymer electrolyte, the hybrid polymer electrolyte comprising:

a copolymer matrix of poly(vinyl chloride) and poly (vinylidene chloride) having a plurality of pores that occupy 10 to 50 volume percent of the hybrid polymer electrolyte; and a solution of an alkali metal salt in an organic solvent entrained in the pores of the copolymer matrix.

10. A method of preparing a hybrid polymer electrolyte, the method comprising the steps of:

obtaining a solution by dissolving an alkali metal salt and an organic solvent in tetrahydrofuran;

obtaining a mixture by mixing a copolymer of poly(vinyl chloride) and poly(vinylidene chloride) with the solution;

forming the mixture into a film; and evaporating off the tetrahydrofuran from the film.

11. The method of claim 10 wherein the alkali metal salt is lithium salt.

12. The method of claim 10 wherein the lithium salt comprises at least one compound selected from the group consisting $LiClO_4$, $LiBF_4$, $LiCF_3SO_3$, $LiAsF_6$, $LiPF_6$, and $LiN(CF_3SO_2)_2$.

13. The method of claim 10 wherein the organic solvent is selected from the group consisting of ethylene carbonate, propylene carbonate, dimethyl carbonate, diethylene carbonate, and mixtures thereof.

* * * * *

UNITED STATES PATENT AND TRADEMARK OFFICE

CERTIFICATE OF CORRECTION

PATENT NO. : 6,395,430 B1
DATED : May 28, 2002
INVENTOR(S) : Cho et al.

It is certified that error appears in the above-identified patent and that said Letters Patent is hereby corrected as shown below:

Column 9,
Line 1, after "consisting" insert -- of --.

Column 10,
Line 18, after "consisting" insert -- of --.

Signed and Sealed this

Eighth Day of April, 2003

JAMES E. ROGAN
*Director of the United States Patent and Trademark Office*